US012563459B2

(12) United States Patent
Liu et al.

(10) Patent No.: US 12,563,459 B2
(45) Date of Patent: Feb. 24, 2026

(54) INTERRUPTION MEASUREMENT FOR DUAL ACTIVE PROTOCOL STACK HANDOVER AND CONDITIONAL HANDOVER

(71) Applicant: QUALCOMM Incorporated, San Diego, CA (US)

(72) Inventors: Huichun Liu, San Diego, CA (US); Gavin Bernard Horn, La Jolla, CA (US); Peng Cheng, Beijing (CN); Xipeng Zhu, San Diego, CA (US); Karthika Paladugu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 602 days.

(21) Appl. No.: 17/759,575

(22) PCT Filed: Feb. 13, 2020

(86) PCT No.: PCT/CN2020/075000
§ 371 (c)(1),
(2) Date: Jul. 27, 2022

(87) PCT Pub. No.: WO2021/159365
PCT Pub. Date: Aug. 19, 2021

(65) Prior Publication Data
US 2023/0103126 A1     Mar. 30, 2023

(51) Int. Cl.
*H04W 36/00*          (2009.01)
(52) U.S. Cl.
CPC ... *H04W 36/0079* (2018.08); *H04W 36/0058* (2018.08)

(58) Field of Classification Search
None
See application file for complete search history.

(56)                References Cited

U.S. PATENT DOCUMENTS

2014/0099955 A1     4/2014 Nukala et al.
2015/0038148 A1*    2/2015 Park ..................... H04W 36/08
                                                          455/437
(Continued)

FOREIGN PATENT DOCUMENTS

CN           110326327 A    10/2019
WO    WO-2015196431 A1     12/2015
(Continued)

OTHER PUBLICATIONS

Huawei, et al., "Comparison of 0ms Interruption Solutions," 3GPP TSG-RAN WG2 Ad Hoc NR #2, R2-1706707, Jun. 27-29, 2017(Jun. 29, 2017) the whole document, 8 pages.
(Continued)

*Primary Examiner* — Saumit Shah
(74) *Attorney, Agent, or Firm* — Harrity & Harrity, LLP

(57)                ABSTRACT

Various aspects of the present disclosure generally relate to wireless communication. In some aspects, a user equipment may detect an interruption trigger to initiate reporting of an interruption parameter associated with a dual active protocol stack handover procedure or a conditional handover procedure; and report the interruption parameter to a base station based at least in part on detecting the interruption trigger, wherein the interruption parameter indicates at least one of a duration of handover interruption or a starting time of handover interruption. Numerous other aspects are provided.

30 Claims, 7 Drawing Sheets

600 ➔

610 ~ Detect an interruption trigger to initiate reporting of an interruption parameter associated with a dual active protocol stack (DAPS) handover procedure or a conditional handover (CHO) procedure 620 ~ Report the interruption parameter to a base station based at least in part on detecting the interruption trigger, wherein the interruption parameter indicates at least one of a duration of handover interruption or a starting time of handover interruption

(56)        References Cited

U.S. PATENT DOCUMENTS

| | | | |
|---|---|---|---|
| 2015/0289157 A1* | 10/2015 | Lundqvist ............. | H04W 24/10 |
| | | | 455/419 |
| 2016/0057687 A1 | 2/2016 | Horn et al. | |
| 2018/0262435 A1 | 9/2018 | Brisebois et al. | |
| 2019/0253945 A1 | 8/2019 | Paladugu et al. | |
| 2021/0352547 A1* | 11/2021 | Chang ................... | H04W 76/27 |
| 2022/0038976 A1* | 2/2022 | Hwang ............. | H04W 36/0079 |
| 2022/0272585 A1* | 8/2022 | Chen ................ | H04W 36/0079 |
| 2022/0322163 A1* | 10/2022 | Awada ............. | H04W 36/0085 |
| 2022/0386204 A1* | 12/2022 | Parichehrehteroujeni ................... | |
| | | | H04W 36/18 |
| 2024/0381443 A1* | 11/2024 | Kim ...................... | H04W 36/08 |

FOREIGN PATENT DOCUMENTS

| | | | |
|---|---|---|---|
| WO | 2018057076 A1 | 3/2018 | |
| WO | 2018141079 | 8/2018 | |
| WO | WO-2021003684 | 1/2021 | |

OTHER PUBLICATIONS

International Search Report and Written Opinion—PCT/CN2020/075000—ISA/EPO—Nov. 17, 2020.
Supplementary European Search Report—EP20918653—Search Authority—Munich—Sep. 25, 2023.

* cited by examiner

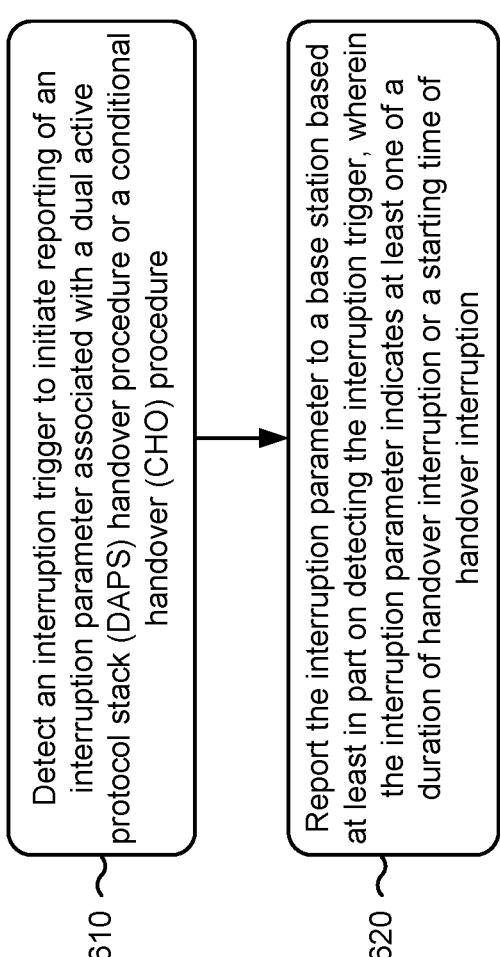

610 — Detect an interruption trigger to initiate reporting of an interruption parameter associated with a dual active protocol stack (DAPS) handover procedure or a conditional handover (CHO) procedure

620 — Report the interruption parameter to a base station based at least in part on detecting the interruption trigger, wherein the interruption parameter indicates at least one of a duration of handover interruption or a starting time of handover interruption

710 — Receive an interruption parameter associated with a DAPS handover procedure or a CHO procedure, wherein the interruption parameter indicates at least one of a duration of handover interruption or a starting time of the handover interruption 720 — Determine the duration of the handover interruption based at least in part on the interruption parameter

INTERRUPTION MEASUREMENT FOR DUAL ACTIVE PROTOCOL STACK HANDOVER AND CONDITIONAL HANDOVER

CROSS-REFERENCE TO RELATED APPLICATION

This application is a 371 national stage of Patent Coop-
eration Treaty (PCT) Application No. PCT/CN2020/07500
filed on Feb. 13, 2020, entitled "INTERRUPTION MEA-
SUREMENT FOR DUAL ACTIVE PROTOCOL STACK
HANDOVER AND CONDITIONAL HANDOVER,"
which is hereby expressly incorporated by reference herein.

FIELD OF THE DISCLOSURE

Aspects of the present disclosure generally relate to
wireless communication and to techniques and apparatuses
for interruption measurement for dual active protocol stack
handover and conditional handover.

BACKGROUND

Wireless communication systems are widely deployed to
provide various telecommunication services such as tele-
phony, video, data, messaging, and broadcasts. Typical
wireless communication systems may employ multiple-
access technologies capable of supporting communication
with multiple users by sharing available system resources
(e.g., bandwidth, transmit power, and/or the like). Examples
of such multiple-access technologies include code division
multiple access (CDMA) systems, time division multiple
access (TDMA) systems, frequency-division multiple
access (FDMA) systems, orthogonal frequency-division
multiple access (OFDMA) systems, single-carrier fre-
quency-division multiple access (SC-FDMA) systems, time
division synchronous code division multiple access (TD-
SCDMA) systems, and Long Term Evolution (LTE). LTE/
LTE-Advanced is a set of enhancements to the Universal
Mobile Telecommunications System (UMTS) mobile stan-
dard promulgated by the Third Generation Partnership Proj-
ect (3GPP).

A wireless communication network may include a number
of base stations (BSs) that can support communication for a
number of user equipment (UEs). A user equipment (UE)
may communicate with a base station (BS) via the downlink
and uplink. The downlink (or forward link) refers to the
communication link from the BS to the UE, and the uplink
(or reverse link) refers to the communication link from the
UE to the BS. As will be described in more detail herein, a
BS may be referred to as a Node B, a gNB, an access point
(AP), a radio head, a transmit receive point (TRP), a New
Radio (NR) BS, a 5G Node B, and/or the like.

The above multiple access technologies have been
adopted in various telecommunication standards to provide
a common protocol that enables different user equipment to
communicate on a municipal, national, regional, and even
global level. New Radio (NR), which may also be referred
to as 5G, is a set of enhancements to the LTE mobile
standard promulgated by the Third Generation Partnership
Project (3GPP). NR is designed to better support mobile
broadband Internet access by improving spectral efficiency,
lowering costs, improving services, making use of new
spectrum, and better integrating with other open standards
using orthogonal frequency division multiplexing (OFDM)
with a cyclic prefix (CP) (CP-OFDM) on the downlink (DL), using CP-OFDM and/or SC-FDM (e.g., also known as
discrete Fourier transform spread OFDM (DFT-s-OFDM))
on the uplink (UL), as well as supporting beamforming,
multiple-input multiple-output (MIMO) antenna technology,
and carrier aggregation. However, as the demand for mobile
broadband access continues to increase, there exists a need
for further improvements in LTE and NR technologies.
Preferably, these improvements should be applicable to
other multiple access technologies and the telecommunica-
tion standards that employ these technologies.

SUMMARY

In some aspects, a method of wireless communication,
performed by a user equipment (UE), may include detecting
an interruption trigger to initiate reporting of an interruption
parameter associated with a dual active protocol stack
(DAPS) handover procedure or a conditional handover
(CHO) procedure; and reporting the interruption parameter
to a base station based at least in part on detecting the
interruption trigger, wherein the interruption parameter indi-
cates at least one of a duration of handover interruption or
a starting time of handover interruption.

In some aspects, a method of wireless communication,
performed by a base station (BS), may include receiving,
from a UE, an interruption parameter associated with a
DAPS handover procedure or a CHO procedure, wherein the
interruption parameter indicates at least one of a duration of
handover interruption or a starting time of the handover
interruption; and determining the duration of the handover
interruption based at least in part on the interruption param-
eter.

In some aspects, a UE for wireless communication may
include memory and one or more processors operatively
coupled to the memory. The memory and the one or more
processors may be configured to detect an interruption
trigger to initiate reporting of an interruption parameter
associated with a DAPS handover procedure or a CHO
procedure; and report the interruption parameter to a base
station based at least in part on detecting the interruption
trigger, wherein the interruption parameter indicates at least
one of a duration of handover interruption or a starting time
of handover interruption.

In some aspects, a BS for wireless communication may
include memory and one or more processors operatively
coupled to the memory. The memory and the one or more
processors may be configured to receive, from a UE, an
interruption parameter associated with a DAPS handover
procedure or a CHO procedure, wherein the interruption
parameter indicates at least one of a duration of handover
interruption or a starting time of the handover interruption;
and determine the duration of the handover interruption
based at least in part on the interruption parameter.

In some aspects, a non-transitory computer-readable
medium may store one or more instructions for wireless
communication. The one or more instructions, when
executed by one or more processors of a UE, may cause the
one or more processors to: detect an interruption trigger to
initiate reporting of an interruption parameter associated
with a DAPS handover procedure or a CHO procedure; and
report the interruption parameter to a base station based at
least in part on detecting the interruption trigger, wherein the
interruption parameter indicates at least one of a duration of
handover interruption or a starting time of handover inter-
ruption.

In some aspects, a non-transitory computer-readable
medium may store one or more instructions for wireless communication. The one or more instructions, when executed by one or more processors of a BS, may cause the one or more processors to: receive, from a UE, an interruption parameter associated with a DAPS handover procedure or a CHO procedure, wherein the interruption parameter indicates at least one of a duration of handover interruption or a starting time of the handover interruption; and determine the duration of the handover interruption based at least in part on the interruption parameter.

In some aspects, an apparatus for wireless communication may include means for detecting an interruption trigger to initiate reporting of an interruption parameter associated with a DAPS handover procedure or a CHO procedure; and means for reporting the interruption parameter to a base station based at least in part on detecting the interruption trigger, wherein the interruption parameter indicates at least one of a duration of handover interruption or a starting time of handover interruption.

In some aspects, an apparatus for wireless communication may include means for receiving, from a UE, an interruption parameter associated with a DAPS handover procedure or a CHO procedure, wherein the interruption parameter indicates at least one of a duration of handover interruption or a starting time of the handover interruption; and means for determining the duration of the handover interruption based at least in part on the interruption parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
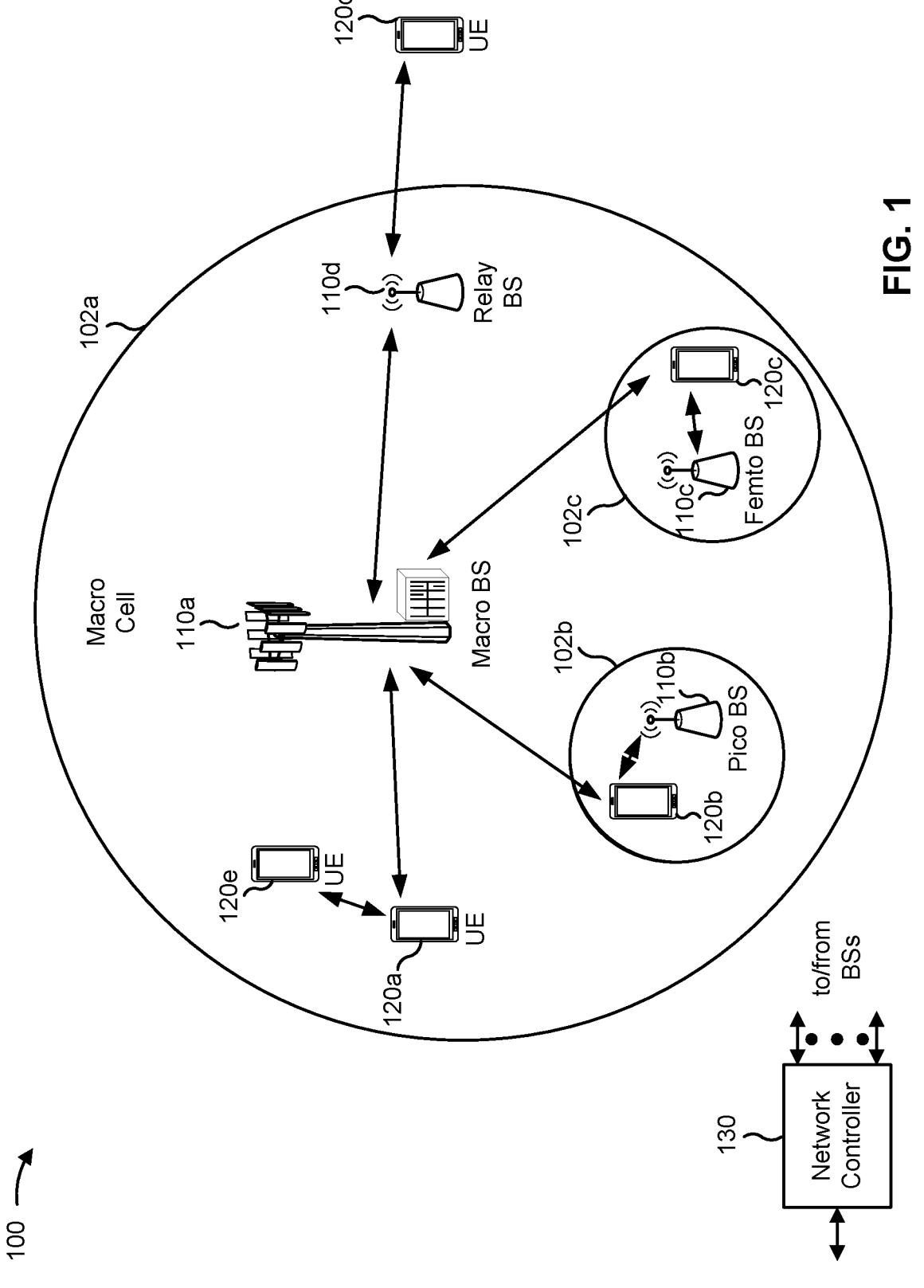
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
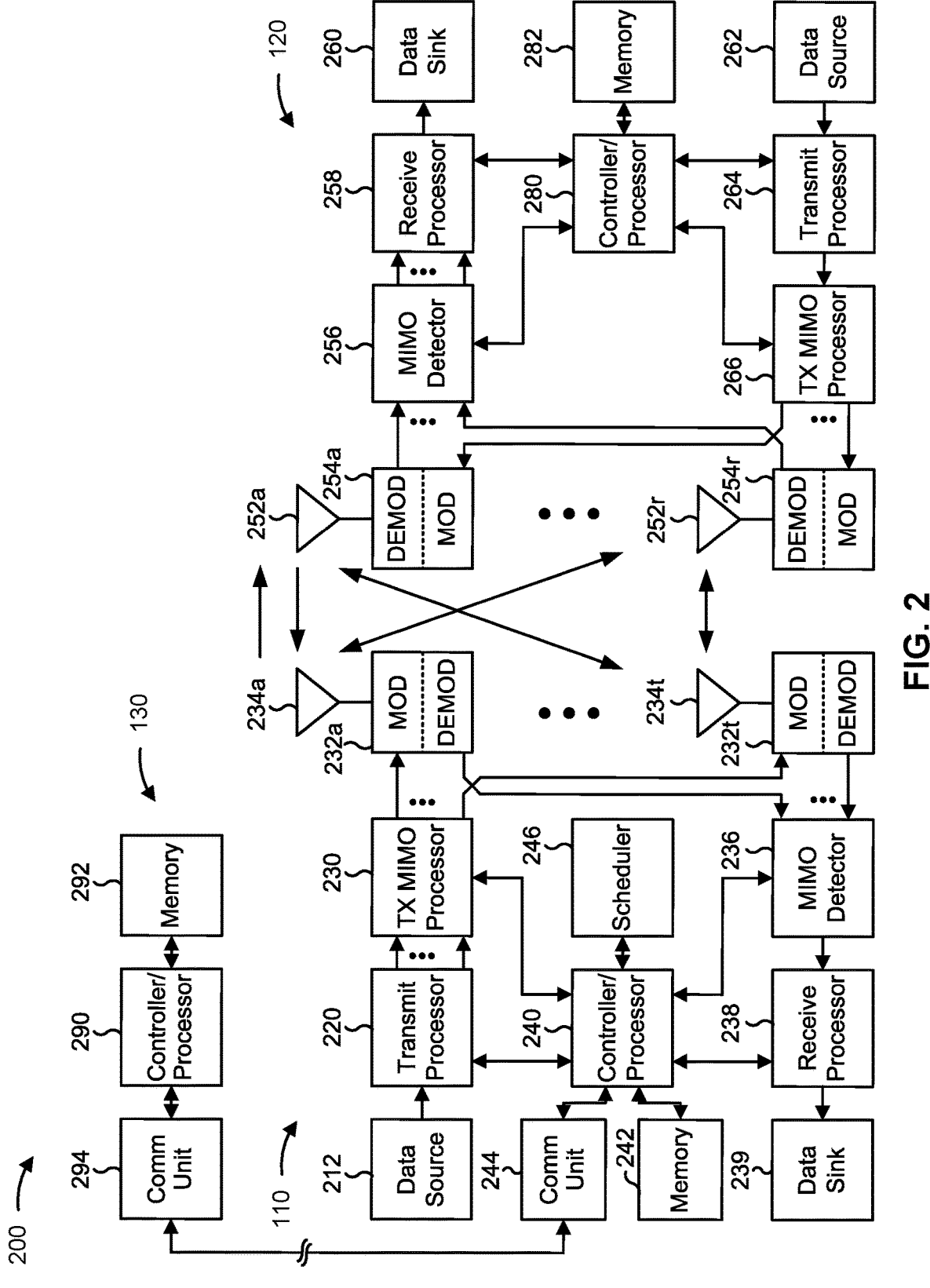
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with interruption measurement for dual active protocol stack (DAPS) handover and conditional handover (CHO), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for detecting an interruption trigger to initiate reporting of an interruption parameter associated with a DAPS handover procedure or a CHO procedure, means for reporting the interruption parameter to a base station based at least in part on detecting the interruption trigger, wherein the interruption parameter indicates at least one of a duration of handover interruption or a starting time of handover interruption, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or the like.

In some aspects, base station 110 may include means for receiving, from a UE, an interruption parameter associated with a DAPS handover procedure or a CHO procedure, wherein the interruption parameter indicates at least one of a duration of handover interruption or a starting time of the handover interruption, means for determining the duration of the handover interruption based at least in part on the interruption parameter, and/or the like. In some aspects, such means may include one or more components of base station 110 described in connection with FIG. 2, such as antenna 234, DEMOD 232, MIMO detector 236, receive processor 238, controller/processor 240, MOD 232, antenna 234, and/or the like.

As indicated above, FIG. 2 is provided as an example. Other examples may differ from what is described with regard to FIG. 2.

Figure 3:
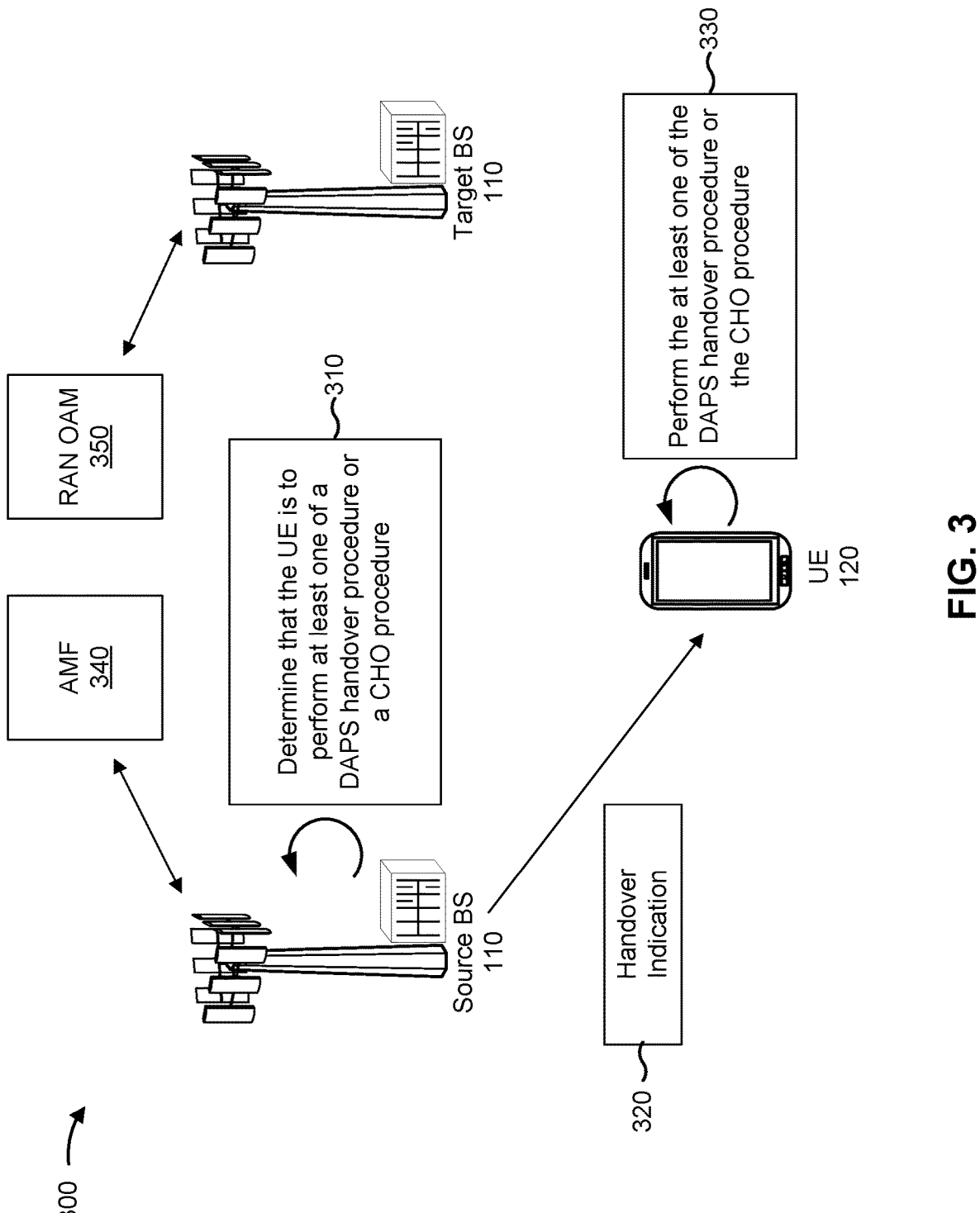
FIG. 3 is a diagram illustrating an example of performing a handover procedure, in accordance with various aspects of the present disclosure.

FIG. 3 is a diagram illustrating an example 300 of performing a handover procedure, in accordance with various aspects of the present disclosure. As shown in FIG. 3, example 300 may include a UE 120, a source BS 110 (e.g., to which the UE 120 is connected via a source connection), and a target BS 110 (e.g., to which the UE 120 is being handed over from the source BS 110 and/or to which the UE 120 is to be connected via a target connection).

As shown by reference number 310, the source BS 110 may determine that the UE 120 is to perform at least one of a dual active protocol stack (DAPS) handover procedure or a conditional handover (CHO) procedure. In some aspects, a DAPS handover procedure may include a multi-phase handover where two protocol stacks are used to handover the UE 120 from a source BS 110 to a target BS 110. In a DAPS handover procedure, packet data convergence protocol (PDCP) functions may be split between the source BS 110 and the target BS 110. For example, the sequence numbering/reordering function may be maintained at the source BS 110, while other PDCP functions run independently at both the source BS 110 and the target BS 110.

In some aspects, a CHO procedure may include a handover where a handover command (e.g., a radio resource configuration (RRC) connection reconfiguration that includes mobility control information) is associated with a condition. For example, when the UE 120 determines that the condition is satisfied, the UE 120 may perform a handover in accordance with the handover command.

In some aspects, a dual connectivity handover procedure may be performed, and may include a handover where a UE 120 is simultaneously connected to a source BS 110 as a primary BS and to a target BS 110 as a secondary BS, and where the source BS 110 and the target BS 110 communicate with each other to exchange roles (e.g., the source BS 110 becomes the secondary BS and the target BS 110 becomes the primary BS).

As shown by reference number 320, the source BS 110 may transmit, and the UE 120 may receive, a handover indication. For example, the handover indication may indicate that the UE is to perform the at least one of a DAPS handover procedure or a CHO procedure. The handover indication may include a handover command that is associated with a DAPS handover procedure, a CHO trigger condition that is associated with a CHO procedure, and/or the like. In some aspects, the handover indication may be included in an RRC connection reconfiguration request. For example, the RRC connection reconfiguration request may be transmitted from the source BS 110 to the UE 120. In some aspects, the RRC connection reconfiguration request may include a set of conditions that the UE 120 is to use to select a target BS 110.

As shown by reference number 330, the UE 120 may perform the at least one of the DAPS handover procedure or the CHO procedure. For example, the UE 120 may perform the at least one of the DAPS handover procedure or the CHO procedure, based at least in part on the handover indication received from the source BS 110.

As shown in FIG. 3, quality of service (QOS), mobility enhancement, and/or the like may be facilitated by a core access and mobility management function (AMF) 340, a radio access network (RAN) Operations Administration and Maintenance (OAM) function 350, and/or the like. Mobility enhancements for UE handover may have certain design targets, such as approximately zero millisecond handover interruption latency (e.g., for real-time gaming applications and other ultra-reliable low latency communications (URLLC) applications), a handover reliability, reduced handover ping-pongs, and/or the like. To satisfy these design targets, various types of handover enhancements may be used.

While these techniques may facilitate satisfaction of design targets related to reliability and/or latency, handover procedures still may result in service interruptions of varying durations and frequency of occurrence. In some aspects described herein, techniques are provided for reporting interruption parameters associated with DAPS handover procedures, CHO procedures, and/or dual connectivity handover procedures. Some aspects of the data collection techniques provided herein for mobility enhancement may enable network vendors and/or operators to evaluate handover interruption performance, which may facilitate optimizing resource configuration to reduce handover user data interruption and improve handover robustness.

As indicated above, FIG. 3 is provided as an example. Other examples are possible and may differ from what was described with respect to FIG. 300.

Figure 4:
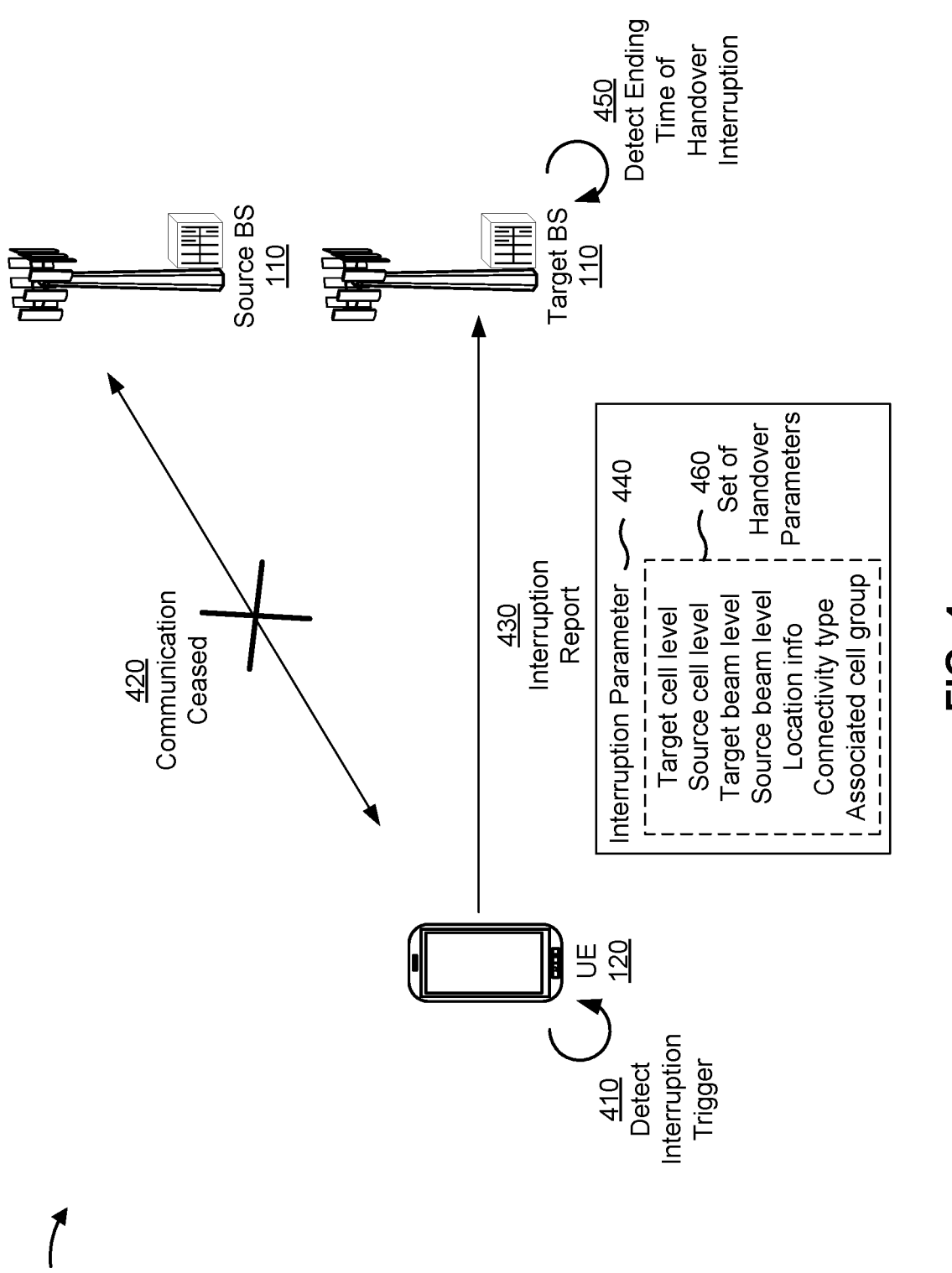
FIGS. 4 and 5 are diagrams illustrating examples of interruption parameter reporting for DAPS handover procedures or CHO procedures, in accordance with various aspects of the present disclosure.

FIG. 4 is a diagram illustrating an example 400 of interruption parameter reporting for DAPS handover procedures or CHO procedures, in accordance with various aspects of the present disclosure. As shown in FIG. 4, a UE 120 may communicate with a source BS 110 and a target BS 110.

As shown by reference number 410, the UE 120 may detect an interruption trigger. The interruption trigger may be configured to cause the UE 120 to initiate reporting of an interruption parameter associated with a DAPS handover procedure or a CHO procedure. In some aspects, the interruption trigger may include a handover command that is associated with the DAPS handover procedure, a CHO trigger condition that is associated with the CHO procedure, and/or the like.

In some aspects, as shown by reference number 420, the interruption trigger may be associated with a cessation of communication with the source BS 110. The communication may cease as a result of the UE 120 tuning away from the source BS 110, and/or the like. In some aspects, the handover procedure may include a secondary cell group (SCG) change. The interruption parameter may correspond to an SCG change interruption.

In some aspects, detecting the interruption trigger may include receiving, from the source BS 110, an interruption measurement activation indication. The interruption measurement activation indication may include a set of interruption measurement configuration parameters, which may indicate the interruption trigger.

As shown by reference number 430, the UE 120 may transmit, and the target BS 110 (or source BS 110, or other network element) may receive, an interruption report. The interruption report may indicate an interruption parameter 440 to the BS 110 based at least in part on detecting the interruption trigger. In some aspects, the interruption parameter may indicate at least one of a duration of handover interruption or a starting time of handover interruption.

In cases in which the interruption parameter indicates a starting time of a handover interruption, the target BS 110 may be configured to determine the duration of the handover interruption, based at least in part on the starting time of the handover interruption. The duration of the handover interruption may include an amount of time between the starting time of the handover interruption and an ending time of the handover interruption. As shown by reference number 450, the target BS 110 may detect the ending time of the handover interruption.

In some aspects, an interruption parameter 440 associated with a DAPS handover procedure may correspond to an uplink interruption during the DAPS handover procedure. The starting time of the handover interruption may include a time at which the UE tunes away from a source cell (e.g., the source BS 110). In some aspects, the ending time of the handover interruption may include a time at which a random access channel (RACH) procedure initiated by the UE 120 with a target cell (e.g., the target BS 110) is successful.

In some aspects, an interruption parameter 440 associated with a CHO procedure may correspond to a data interruption during the CHO procedure. The duration of the handover interruption associated with the CHO procedure may include an amount of time between the starting time of the handover interruption and an ending time of the handover interruption. The starting time of the handover interruption may include a time at which a CHO trigger condition is satisfied. The ending time of the handover interruption may include a time at which the CHO procedure is completed.

As is further shown by reference number 430, the interruption report may include a set 460 of handover parameters. The handover parameters may indicate a cell level corresponding to a target cell, a cell level corresponding to a source cell, a beam level corresponding to a beam associated with the target cell, a beam level corresponding to a beam associated with the source cell, location information corresponding to the UE, a handover type, a connectivity type, an associated cell group, and/or the like.

In some aspects, the CHO procedure includes a near-radio link failure (RLF) procedure in which an initial handover failure was followed by selection of a CHO candidate cell by the UE 120. Reporting the interruption parameter to the BS 110 may include transmitting an enhanced RLF report. The enhanced RLF report may include a set of near-RLF parameters. In some aspects, the set of near-RLF parameters may indicate a handover type (DAPS, CHO, and/or the like); a cell level corresponding to a serving cell (RSRP, RSRQ, and/or the like); a beam level corresponding to a serving cell; a cell level corresponding to the CHO candidate cell; a beam level corresponding to the CHO candidate cell; RACH failure information (time expiry, no response to message 1, no response to message 3, collision, and/or the like); a cause of handover failure, where the cause of handover failure comprises a legacy handover failure or a failure to access the CHO candidate cell; a CHO signal parameter (RSRP, RSRQ, and/or the like), the CHO parameter indicating a signal measurement associated with the CHO candidate cell; and/ or the like.

In some aspects, techniques for reporting handover interruption measurements described herein may enable network vendors and/or operators to evaluate handover interruption performance, which may facilitate optimizing resource configuration to reduce handover user data interruption and improve handover robustness.

As indicated above, FIG. 4 is provided as an example. Other examples may differ from what is described with respect to FIG. 4.

Figure 5:
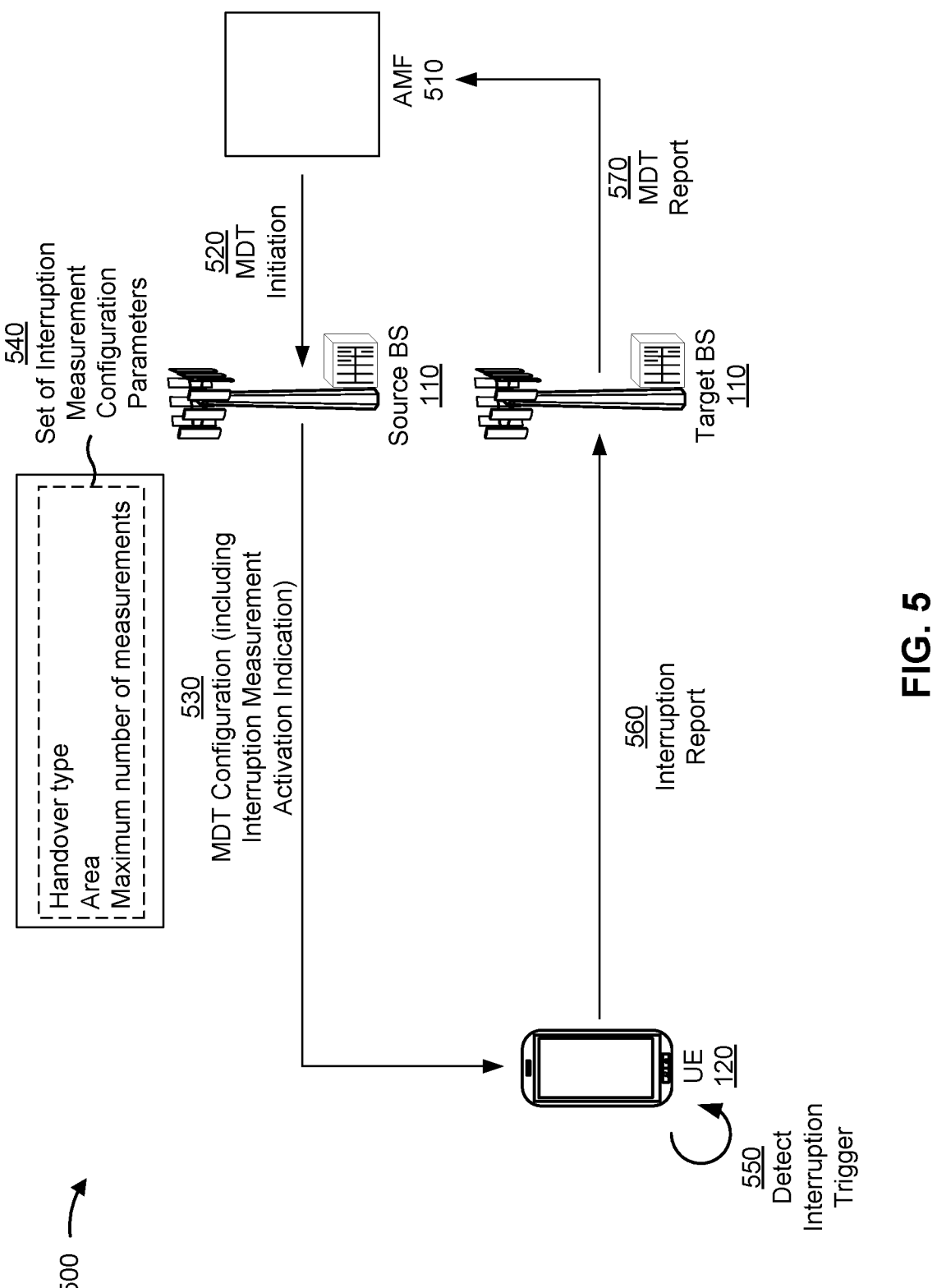

FIG. 5 is a diagram illustrating another example 500 of interruption parameter reporting for DAPS handover procedures or CHO procedures, in accordance with various aspects of the present disclosure. As shown in FIG. 5, a UE 120 may communicate with a source BS 110 and a target BS 110. An AMF 510 may communicate with the source BS 110 and the target BS 110.

As shown by reference number 520, the AMF 510 may transmit, and the source BS 110 may receive, a minimization of drive test (MDT) initiation communication. The MDT initiation communication may include an MDT configuration. As shown by reference number 530, the source BS 110 may transmit, and the UE 120 may receive, an MDT configuration based at least in part on the MDT initiation communication. The MDT configuration may include an interruption measurement activation indication.

In some aspects, the MDT configuration may be associated with a signaling-based MDT procedure. In some aspects, the MDT configuration may be associated with a management-based MDT procedure. In some aspects, instead of, or in addition to the AMF 510, an MDT procedure may be initiated by a RAN Operation Administration and Management (OAM) function.

The MDT configuration may include a set 540 of interruption measurement configuration parameters. The set of interruption measurement configuration parameters may indicate a handover type for which interruption measurements are to be taken by the UE, an area (e.g., cell or cells) within which interruption measurements are to be taken by the UE, a maximum number of handover interruption measurements to be taken by the UE, and/or the like.

As shown by reference number 550, the UE 120 may detect an interruption trigger. The interruption trigger may be similar to the interruption trigger discussed above in connection with FIG. 4. The interruption trigger may be configured to cause the UE 120 to initiate reporting of an interruption parameter associated with a DAPS handover procedure or a CHO procedure. As shown by reference number 560, the UE 120 may transmit, and the target BS 110 may receive, an interruption report. The interruption report may include the interruption parameter and may be transmitted to the target BS 110 based at least in part on detecting the interruption trigger. The interruption parameter indicates at least one of a duration of handover interruption or a starting time of handover interruption.

In some aspects, the UE 120 may report the interruption parameter to the target BS 110 by transmitting the interruption parameter in an event-based report according to an immediate MDT. In some aspects, the event-based report may include at least one of a handover complete message, a dedicated interruption measurement report, and/or the like. In some aspects, the UE 120 may report the interruption parameter to the BS 110 by transmitting the interruption parameter in a log report according to a logged MDT procedure.

In some aspects, the interruption report may be transmitted to the target BS 110 in response to a request, from the target BS 110, for the interruption report. In some aspects, the UE 120 may transmit, to the base station, an indication of availability of the log report. The request for the interruption report may be transmitted to the UE 120 in response to receiving the indication of availability of the log report. The interruption report may include an interruption parameter and/or a set of handover parameters, as described above in connection with FIG. 4. As shown by reference number 570, the target BS 110 may provide an MDT report to the AMF 510. The MDT report may include the interruption parameter and/or a set of handover parameters.

In some aspects, techniques for reporting handover interruption measurements described herein may enable network vendors and/or operators to evaluate handover interruption performance, which may facilitate optimizing resource configuration to reduce handover user data interruption and improve handover robustness. In some aspects, using MDT signaling to configure and report the interruption measurements enables accomplishing the reporting without introducing additional signaling overhead.

As indicated above, FIG. 5 is provided as an example. Other examples may differ from what is described with respect to FIG. 5.

FIG. 6 is a diagram illustrating an example process 600 performed, for example, by a user equipment (UE), in accordance with various aspects of the present disclosure. Example process 600 is an example where the UE (e.g., UE 120 and/or the like) performs operations associated with interruption parameter reporting for DAPS handover procedures or CHO procedures.

As shown in FIG. 6, in some aspects, process 600 may include detecting an interruption trigger to initiate reporting of an interruption parameter associated with a DAPS handover procedure or a CHO procedure (block 610). For example, the UE (e.g., using receive processor 258, transmit processor 264, controller/processor 280, memory 282, and/or the like) may detect an interruption trigger to initiate reporting of an interruption parameter associated with a DAPS handover procedure or a CHO procedure, as described above.

As further shown in FIG. 6, in some aspects, process 600 may include reporting the interruption parameter to a base station based at least in part on detecting the interruption trigger, wherein the interruption parameter indicates at least one of a duration of handover interruption or a starting time of handover interruption (block 620). For example, the UE (e.g., transmit processor 264, controller/processor 280, memory 282, and/or the like) may report the interruption parameter to a base station based at least in part on detecting the interruption trigger, as described above. In some aspects, the interruption parameter indicates at least one of a duration of handover interruption or a starting time of handover interruption.

Process 600 may include additional aspects, such as any single aspect or any combination of aspects described below and/or in connection with one or more other processes described elsewhere herein.

In a first aspect, the interruption parameter associated with the DAPS handover procedure corresponds to an uplink interruption during the DAPS handover procedure.

In a second aspect, alone or in combination with the first aspect, the duration of the handover interruption comprises an amount of time between the starting time of the handover interruption and an ending time of the handover interruption, where the starting time of the handover interruption comprises a time at which the UE tunes away from a source cell.

In a third aspect, alone or in combination with one or more of the first and second aspects, the ending time of the handover interruption comprises a time at which a random access channel (RACH) procedure initiated by the UE with a target cell is successful.

In a fourth aspect, alone or in combination with one or more of the first through third aspects, the duration of the handover interruption associated with the CHO procedure comprises an amount of time between the starting time of the handover interruption and an ending time of the handover interruption, where the starting time of the handover interruption comprises a time at which a CHO trigger condition is satisfied.

In a fifth aspect, alone or in combination with one or more of the first through fourth aspects, the ending time of the handover interruption comprises a time at which the CHO procedure is completed.

In a sixth aspect, alone or in combination with one or more of the first through fifth aspects, detecting the interruption trigger comprises receiving, from the base station, an interruption measurement activation indication.

In a seventh aspect, alone or in combination with one or more of the first through sixth aspects, the interruption measurement activation indication is transmitted to the UE in an MDT configuration.

In an eighth aspect, alone or in combination with one or more of the first through seventh aspects, the MDT configuration is associated with a signaling-based MDT procedure or a management-based MDT procedure.

In a ninth aspect, alone or in combination with one or more of the first through eighth aspects, process 600 includes receiving, from the base station, a set of interruption measurement configuration parameters, the set of interruption measurement configuration parameters indicating at least one of: a handover type for which interruption measurements are to be taken by the UE, an area within which interruption measurements are to be taken by the UE, a maximum number of handover interruption measurements to be taken by the UE, or a combination thereof.

In a tenth aspect, alone or in combination with one or more of the first through ninth aspects, detecting the interruption trigger comprises receiving, from the base station, an interruption measurement activation indication, where the interruption measurement activation indication comprises the set of interruption measurement configuration parameters.

In an eleventh aspect, alone or in combination with one or more of the first through tenth aspects, the set of interruption measurement configuration parameters further indicates the interruption trigger.

In a twelfth aspect, alone or in combination with one or more of the first through eleventh aspects, the interruption trigger comprises: a handover command that is associated with the DAPS handover procedure, or a CHO trigger condition that is associated with the CHO procedure.

In a thirteenth aspect, alone or in combination with one or more of the first through twelfth aspects, reporting the interruption parameter to the base station comprises transmitting the interruption parameter in an event-based report according to an immediate MDT procedure.

In a fourteenth aspect, alone or in combination with one or more of the first through thirteenth aspects, the event-based report comprises at least one of a handover complete message, a dedicated interruption measurement report, or a combination thereof.

In a fifteenth aspect, alone or in combination with one or more of the first through fourteenth aspects, reporting the interruption parameter to the base station comprises transmitting the interruption parameter in a log report according to a logged MDT procedure.

In a sixteenth aspect, alone or in combination with one or more of the first through fifteenth aspects, process 600 includes transmitting, to the base station, an indication of availability of the log report.

In a seventeenth aspect, alone or in combination with one or more of the first through sixteenth aspects, the interruption parameter corresponds to a secondary cell group (SCG) change interruption, and the base station is associated with a target SCG, a master cell group (MCG), or a combination thereof.

In an eighteenth aspect, alone or in combination with one or more of the first through seventeenth aspects, process 600 includes transmitting an interruption report comprising the interruption parameter and a set of handover parameters indicating at least one of a cell level corresponding to a target cell, a cell level corresponding to a source cell, a beam level corresponding to a beam associated with the target cell, a beam level corresponding to a beam associated with the source cell, location information corresponding to the UE, a handover type, a connectivity type, an associated cell group, or a combination thereof.

In a nineteenth aspect, alone or in combination with one or more of the first through eighteenth aspects, the CHO procedure comprises a near-radio link failure (RLF) procedure in which an initial handover failure was followed by selection of a CHO candidate cell by the UE.

In a twentieth aspect, alone or in combination with one or more of the first through nineteenth aspects, reporting the interruption parameter to the base station comprises transmitting an enhanced RLF report, the enhanced RLF report comprising a set of near-RLF parameters, the set of near- RLF parameters indicating at least one of: a handover type, a cell level corresponding to a serving cell, a beam level corresponding to a serving cell, a cell level corresponding to the CHO candidate cell, a beam level corresponding to the CHO candidate cell, RACH failure information, a cause of handover failure, wherein the cause of handover failure comprises a legacy handover failure or a failure to access the CHO candidate cell, a CHO signal parameter, the CHO parameter indicating a signal measurement associated with the CHO candidate cell, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
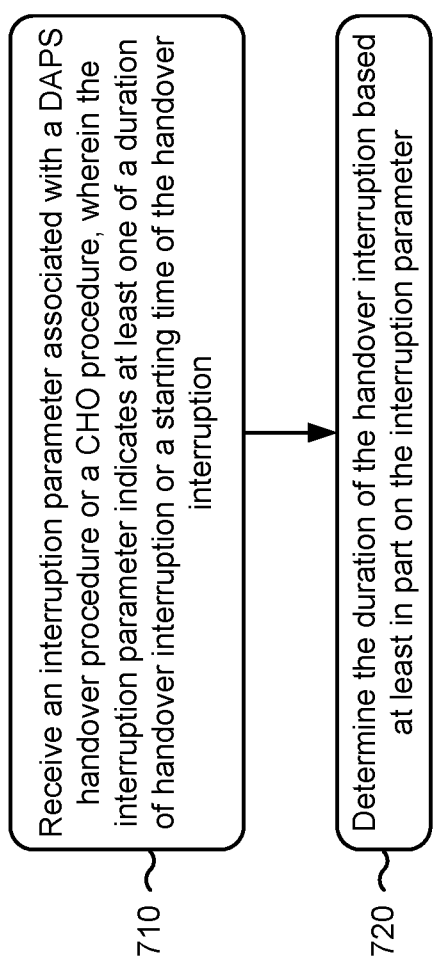
FIG. 7 is a diagram illustrating an example process performed, for example, by a base station, in accordance with various aspects of the present disclosure.

FIG. 7 is a diagram illustrating an example process 700 performed, for example, by a base station (BS), in accordance with various aspects of the present disclosure. Example process 700 is an example where the BS (e.g., BS 110 and/or the like) performs operations associated with interruption parameter reporting for DAPS handover procedures or CHO procedures.

As shown in FIG. 7, in some aspects, process 700 may include receiving, from a UE, an interruption parameter associated with a DAPS handover procedure or a CHO procedure, wherein the interruption parameter indicates at least one of a duration of handover interruption or a starting time of the handover interruption (block 710). For example, the BS (e.g., receive processor 238, controller/processor 240, memory 242, and/or the like) may receive, from a UE, an interruption parameter associated with a DAPS handover procedure or a CHO procedure, as described above. In some aspects, the interruption parameter indicates at least one of a duration of handover interruption or a starting time of the handover interruption.

As further shown in FIG. 7, in some aspects, process 700 may include determining the duration of the handover interruption based at least in part on the interruption parameter (block 720). For example, the BS (e.g., using transmit processor 220, receive processor 238, controller/processor 240, memory 242, and/or the like) may determine the duration of the handover interruption based at least in part on the interruption parameter, as described above.

Process 700 may include additional aspects, such as any single aspect or any combination of aspects described below and/or in connection with one or more other processes described elsewhere herein.

In a first aspect, the interruption parameter associated with the DAPS handover procedure corresponds to an uplink interruption during the DAPS handover procedure.

In a second aspect, alone or in combination with the first aspect, the duration of the handover interruption comprises an amount of time between the starting time of the handover interruption and an ending time of the handover interruption, where the starting time of the handover interruption comprises a time at which the UE tunes away from a source cell.

In a third aspect, alone or in combination with one or more of the first and second aspects, the ending time of the handover interruption comprises a time at which a RACH procedure initiated by the UE with a target cell is successful.

In a fourth aspect, alone or in combination with one or more of the first through third aspects, the duration of the handover interruption associated with the CHO procedure comprises an amount of time between the starting time of the handover interruption and an ending time of the handover interruption, where the starting time of the handover interruption comprises a time at which a CHO trigger condition is satisfied.

In a fifth aspect, alone or in combination with one or more of the first through fourth aspects, the ending time of the handover interruption comprises a time at which the CHO procedure is completed.

In a sixth aspect, alone or in combination with one or more of the first through fifth aspects, process 700 includes transmitting, to the UE, an interruption measurement activation indication.

In a seventh aspect, alone or in combination with one or more of the first through sixth aspects, the interruption measurement activation indication is transmitted to the UE in an MDT configuration.

In an eighth aspect, alone or in combination with one or more of the first through seventh aspects, the MDT configuration is associated with a signaling-based MDT procedure or a management-based MDT procedure.

In a ninth aspect, alone or in combination with one or more of the first through eighth aspects, process 700 includes transmitting, to the UE, a set of interruption measurement configuration parameters, the set of interruption measurement configuration parameters indicating at least one of: a handover type for which interruption measurements are to be taken by the UE, an area within which interruption measurements are to be taken by the UE, a maximum number of handover interruption measurements to be taken by the UE, or a combination thereof.

In a tenth aspect, alone or in combination with one or more of the first through ninth aspects, the interruption measurement activation indication comprises the set of interruption measurement configuration parameters.

In an eleventh aspect, alone or in combination with one or more of the first through tenth aspects, the set of interruption measurement configuration parameters further indicate an interruption trigger.

In a twelfth aspect, alone or in combination with one or more of the first through eleventh aspects, the interruption trigger comprises: a handover command that is associated with the DAPS handover procedure, or a CHO trigger condition that is associated with the CHO procedure.

In a thirteenth aspect, alone or in combination with one or more of the first through twelfth aspects, receiving the interruption parameter comprises receiving the interruption parameter in an event-based report according to an immediate MDT procedure.

In a fourteenth aspect, alone or in combination with one or more of the first through thirteenth aspects, the event-based report comprises at least one of a handover complete message, a dedicated interruption measurement report, or a combination thereof.

In a fifteenth aspect, alone or in combination with one or more of the first through fourteenth aspects, receiving the interruption parameter comprises receiving the interruption parameter in a log report according to a logged MDT procedure.

In a sixteenth aspect, alone or in combination with one or more of the first through fifteenth aspects, process 700 includes receiving, from the UE, an indication of availability of the log report.

In a seventeenth aspect, alone or in combination with one or more of the first through sixteenth aspects, the interruption parameter corresponds to an SCG change interruption, and the base station is associated with a target SCG, an MCG, or a combination thereof.

In an eighteenth aspect, alone or in combination with one or more of the first through seventeenth aspects, receiving the interruption parameter comprises receiving an interruption report comprising the interruption parameter and a set of handover parameters indicating at least one of: a cell level corresponding to a target cell, a cell level corresponding to a source cell, a beam level corresponding to a beam associated with the target cell, a beam level corresponding to a beam associated with the source cell, location information corresponding to the UE, a handover type, a connectivity type, an associated cell group, or a combination thereof.

In a nineteenth aspect, alone or in combination with one or more of the first through eighteenth aspects, the CHO procedure comprises a near-RLF procedure in which an initial handover failure was followed by selection of a CHO candidate cell by the UE.

In a twentieth aspect, alone or in combination with one or more of the first through nineteenth aspects, receiving the interruption parameter comprises receiving an enhanced RLF report, the enhanced RLF report comprising a set of near-RLF parameters, the set of near-RLF parameters indicating at least one of: a handover type, a cell level corresponding to a serving cell, a beam level corresponding to a serving cell, a cell level corresponding to the CHO candidate cell, a beam level corresponding to the CHO candidate cell, RACH failure information, a cause of handover failure, wherein the cause of handover failure comprises a legacy handover failure or a failure to access the CHO candidate cell, a CHO signal parameter, the CHO parameter indicating a signal measurement associated with the CHO candidate cell, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A user equipment (UE) for wireless communication, comprising:
   one or more memories; and
   one or more processors, coupled to the one or more memories, configured to:
      detect an interruption trigger to initiate reporting of an interruption parameter associated with a conditional handover (CHO) procedure,
         wherein the interruption trigger is associated with a cessation of communication with a source network entity; and
      report the interruption parameter to a target network entity based at least in part on a detection of the interruption trigger,
         wherein the interruption parameter indicates an amount of time between a starting time and an ending time of a handover interruption, and
         wherein the ending time of the handover interruption includes a time at which the CHO procedure is completed.

2. The UE of claim 1, wherein the starting time of the handover interruption comprises a time at which a CHO trigger condition is satisfied.

3. The UE of claim 1, wherein the one or more processors, to detect the interruption trigger, are configured to receive, from the source network entity, an interruption measurement activation indication.

4. The UE of claim 3, wherein the one or more processors, to receive the interruption measurement activation indication, are configured to receive the interruption measurement activation indication in a minimization of drive test (MDT) configuration.

5. The UE of claim 4, wherein the MDT configuration is associated with a signaling-based MDT procedure or a management-based MDT procedure.

6. The UE of claim 1, wherein the one or more processors are further configured to receive, from the source network entity, a set of interruption measurement configuration parameters, the set of interruption measurement configuration parameters indicating at least one of:

a handover type for which interruption measurements are to be taken by the UE, an area within which interruption measurements are to be taken by the UE, or a maximum number of handover interruption measurements to be taken by the UE.

7. The UE of claim 6, wherein the one or more processors, to detect the interruption trigger, are configured to receive, from the source network entity, an interruption measurement activation indication, wherein the interruption measurement activation indication comprises the set of interruption measurement configuration parameters.

8. The UE of claim 6, wherein the set of interruption measurement configuration parameters further indicates the interruption trigger.

9. The UE of claim 1, wherein the interruption trigger comprises:

a CHO trigger condition that is associated with the CHO procedure.

10. The UE of claim 1, wherein the one or more processors, to report the interruption parameter to the target network entity, are configured to transmit the interruption parameter in an event-based report according to an immediate minimization of drive test (MDT) procedure.

11. The UE of claim 10, wherein the event-based report comprises at least one of a handover complete message, or a dedicated interruption measurement report.

12. The UE of claim 1, wherein the one or more processors, to report the interruption parameter to the target network entity, are configured to transmit the interruption parameter in a log report according to a logged minimization of drive test (MDT) procedure.

13. The UE of claim 12, wherein the one or more processors are further configured to transmit, to the target network entity, an indication of availability of the log report.

14. The UE of claim 1, wherein the interruption parameter corresponds to a secondary cell group (SCG) change interruption, and wherein the target network entity is associated with a target SCG, a master cell group (MCG), or a combination thereof.

15. The UE of claim 1, wherein the one or more processors, to report the interruption parameter to the target network entity, are configured to transmit an interruption report comprising the interruption parameter and a set of handover parameters indicating at least one of:

a cell level corresponding to a target cell, a cell level corresponding to a source cell, a beam level corresponding to a beam associated with the target cell, a beam level corresponding to a beam associated with the source cell, location information corresponding to the UE, a handover type, a connectivity type, or an associated cell group.

16. The UE of claim 1, wherein the CHO procedure comprises a near-radio link failure (RLF) procedure in which an initial handover failure was followed by selection of a CHO candidate cell by the UE.

17. The UE of claim 1, wherein the one or more processors, to report the interruption parameter to the target network entity, are configured to transmit an enhanced RLF report, the enhanced RLF report comprising a set of near-RLF parameters, the set of near-RLF parameters indicating at least one of:

a handover type, a cell level corresponding to a serving cell, a beam level corresponding to a serving cell, a cell level corresponding to a CHO candidate cell, a beam level corresponding to a CHO candidate cell, random access channel (RACH) failure information, a cause of handover failure, wherein the cause of handover failure comprises a legacy handover failure or a failure to access a CHO candidate cell, or a CHO signal parameter, the CHO signal parameter indicating a signal measurement associated with a CHO candidate cell.

18. A target network entity for wireless communication, comprising:

one or more memories; and one or more processors, coupled to the one or more memories, configured to:

receive, from a user equipment (UE), an interruption parameter associated with a conditional handover (CHO) procedure, wherein the interruption parameter indicates an amount of time between a starting time and an ending time of handover interruption, wherein the ending time of the handover interruption includes a time at which the CHO procedure is completed, and wherein the handover interruption is associated with a cessation of communication between the UE and a source network entity; and determine a duration of the handover interruption based at least in part on the interruption parameter.

19. The target network entity of claim 18, wherein the one or more processors are further configured to transmit, to the UE, a set of interruption measurement configuration parameters, the set of interruption measurement configuration parameters indicating at least one of:

a handover type for which interruption measurements are to be taken by the UE, an area within which interruption measurements are to be taken by the UE, or a maximum number of handover interruption measurements to be taken by the UE.

20. The target network entity of claim 19, wherein the one or more processors are further configured to transmit, to the UE, an interruption measurement activation indication, wherein the interruption measurement activation indication comprises the set of interruption measurement configuration parameters.

21. A method of wireless communication performed by a user equipment (UE), comprising:

detecting an interruption trigger to initiate reporting of an interruption parameter associated with a conditional handover (CHO) procedure, wherein the interruption trigger is associated with a cessation of communication with a source network entity; and reporting the interruption parameter to a target network entity based at least in part on detecting the interruption trigger, wherein the interruption parameter indicates an amount of time between a starting time and an ending time of a handover interruption, and wherein the ending time of the handover interruption includes a time at which the CHO procedure is completed.

22. The method of claim 21, wherein reporting the interruption parameter to the target network entity comprises transmitting an interruption report comprising the interruption parameter and a set of handover parameters indicating at least one of:
 a cell level corresponding to a target cell,
 a cell level corresponding to a source cell,
 a beam level corresponding to a beam associated with the target cell,
 a beam level corresponding to a beam associated with the source cell,
 location information corresponding to the UE,
 a handover type,
 a connectivity type, or
 an associated cell group.
 23. The method of claim 21, wherein the starting time of the handover interruption comprises a time at which a CHO trigger condition is satisfied.
 24. The method of claim 21, wherein detecting the interruption trigger comprises receiving, from the source network entity, an interruption measurement activation indication.
 25. The method of claim 24, wherein the interruption measurement activation indication is received in a minimization of drive test (MDT) configuration.
 26. The method of claim 25, wherein the MIDT configuration is associated with a signaling-based MIDT procedure or a management-based MDT procedure.
 27. A method of wireless communication performed by a target network entity, comprising:
 receiving, from a user equipment (UE), an interruption parameter associated with a conditional handover (CHO) procedure,
  wherein the interruption parameter indicates an amount of time between a starting time and an ending time of a handover interruption,
  wherein the ending time of the handover interruption includes a time at which the CHO procedure is completed, and
  wherein the handover interruption is associated with a cessation of communication between the UE and a source network entity; and
 determining a duration of the handover interruption based at least in part on the interruption parameter.
 28. The method of claim 27, further comprising:
 transmitting, to the UE, a set of interruption measurement configuration parameters, the set of interruption measurement configuration parameters indicating at least one of:

22 a handover type for which interruption measurements are to be taken by the UE,
 an area within which interruption measurements are to be taken by the UE, or
 a maximum number of handover interruption measurements to be taken by the UE.
 29. A non-transitory computer-readable medium storing a set of instructions for wireless communication, the set of instructions comprising:
 one or more instructions that, when executed by one or more processors of a user equipment (UE), cause the UE to:
  detect an interruption trigger to initiate reporting of an interruption parameter associated with a conditional handover (CHO) procedure,
   wherein the interruption trigger is associated with a cessation of communication with a source network entity; and
  report the interruption parameter to a target network entity based at least in part on a detection of the interruption trigger,
   wherein the interruption parameter indicates an amount of time between a starting time and an ending time of a handover interruption, and
   wherein the ending time of the handover interruption includes a time at which the CHO procedure is completed.
 30. The non-transitory computer-readable medium of claim 29, wherein the one or more instructions, that cause the UE to report the interruption parameter to the target network entity, are configured to transmit an interruption report comprising the interruption parameter and a set of handover parameters indicating at least one of:
 a cell level corresponding to a target cell,
 a cell level corresponding to a source cell,
 a beam level corresponding to a beam associated with the target cell,
 a beam level corresponding to a beam associated with the source cell,
 location information corresponding to the UE,
 a handover type,
 a connectivity type, or
 an associated cell group.

* * * * *